United States Patent
Joubert et al.

(10) Patent No.: US 10,414,680 B2
(45) Date of Patent: Sep. 17, 2019

(54) METHOD FOR THE BIOLOGICAL TREATMENT OF SULPHATE CONTAINING WASTE WATER, VIA REDUCTION OF SULPHATE TO SULPHIDE THEN ITS OXIDATION TO ELEMENTAL SULPHUR

(71) Applicant: Water Research Commission, Pretoria (ZA)

(72) Inventors: Johannes Hendrikus Brand Joubert, Pretoria (ZA); Gina Pocock, Pretoria (ZA)

(73) Assignee: Water Research Commission, Pretoria (ZA)

( * ) Notice: Subject to any disclaimer, the term of this patent is extended or adjusted under 35 U.S.C. 154(b) by 0 days.

(21) Appl. No.: 15/326,748

(22) PCT Filed: Jul. 14, 2015

(86) PCT No.: PCT/IB2015/005316
§ 371 (c)(1),
(2) Date: Jan. 17, 2017

(87) PCT Pub. No.: WO2016/009346
PCT Pub. Date: Jan. 21, 2016

(65) Prior Publication Data
US 2017/0210655 A1 Jul. 27, 2017

(30) Foreign Application Priority Data
Jul. 18, 2014 (ZA) .................................. 2014/05615

(51) Int. Cl.
*C02F 9/00* (2006.01)
*C02F 3/00* (2006.01)
(Continued)

(52) U.S. Cl.
CPC ................ *C02F 9/00* (2013.01); *C02F 3/087* (2013.01); *C02F 1/20* (2013.01); *C02F 1/441* (2013.01);
(Continued)

(58) Field of Classification Search
None
See application file for complete search history.

(56) References Cited

U.S. PATENT DOCUMENTS

| | | | |
|---|---|---|---|
| 5,587,079 A | 12/1996 | Rowley et al. | |
| 6,197,196 B1 | 3/2001 | Rose et al. | |

(Continued)

FOREIGN PATENT DOCUMENTS

| | | |
|---|---|---|
| EP | 1124763 A1 | 8/2001 |
| WO | 91/16269 A1 | 10/1991 |

(Continued)

OTHER PUBLICATIONS

Patent Cooperation Treaty, International Search Report and Written Opinion of the International Searching Authority for PCT/IB2015/055316, dated Jan. 21, 2016, 13 pages.

*Primary Examiner* — Hayden Brewster
(74) *Attorney, Agent, or Firm* — Heslin Rothenberg Farley & Mesiti P.C.

(57) ABSTRACT

A process for treating sulphate containing effluent, which includes receiving a sulphide containing effluent into a two-phase fluidised bed reactor containing particles and floating media, permitting calcium carbonate from the effluent to precipitate on particles in the first fluidised bed reactor, aerating the solution in the reactor to remove $CO_2$ from the solution, thereby to increase the pH in the reactor, permitting biological sulphide oxidation to occur on the floating media by means of sulphide oxidizing bacteria thereby to produce elemental sulphur, recycling the fluidised (Continued)

bed reactor at a sufficient rate to effect abrasion to remove elemental sulphur from the floating media, harvesting the sulphur from a top portion of the reactor, recycling hydroxyl ions internally in solution in to enhance calcium carbonate precipitation by further increasing the pH.

14 Claims, 1 Drawing Sheet

(51) Int. Cl.
| | |
|---|---|
| *C02F 3/02* | (2006.01) |
| *C02F 3/08* | (2006.01) |
| C02F 3/30 | (2006.01) |
| C02F 1/52 | (2006.01) |
| C02F 1/66 | (2006.01) |
| C02F 3/34 | (2006.01) |
| C02F 101/10 | (2006.01) |
| C02F 103/10 | (2006.01) |
| C02F 1/20 | (2006.01) |
| C02F 1/44 | (2006.01) |
| C02F 1/72 | (2006.01) |
| C02F 3/04 | (2006.01) |
| C02F 101/20 | (2006.01) |

(52) U.S. Cl.
CPC .............. *C02F 1/5236* (2013.01); *C02F 1/66* (2013.01); *C02F 1/72* (2013.01); *C02F 3/04* (2013.01); *C02F 3/345* (2013.01); *C02F 2101/101* (2013.01); *C02F 2101/203* (2013.01); *C02F 2103/10* (2013.01); *C02F 2305/06* (2013.01); *Y02W 10/15* (2015.05)

(56) References Cited

U.S. PATENT DOCUMENTS

| | | |
|---|---|---|
| 6,203,700 B1 | 3/2001 | Rose et al. |
| 6,306,302 B1* | 10/2001 | Maree .................... C02F 3/345 210/605 |
| 2002/0185437 A1 | 12/2002 | Haridas et al. |
| 2009/0045135 A1* | 2/2009 | Khudenko ............. C02F 1/004 210/631 |

FOREIGN PATENT DOCUMENTS

| | | |
|---|---|---|
| WO | 94/29227 A1 | 12/1994 |
| WO | 99/06328 A1 | 11/1999 |
| WO | 2005/044742 A1 | 5/2005 |

* cited by examiner

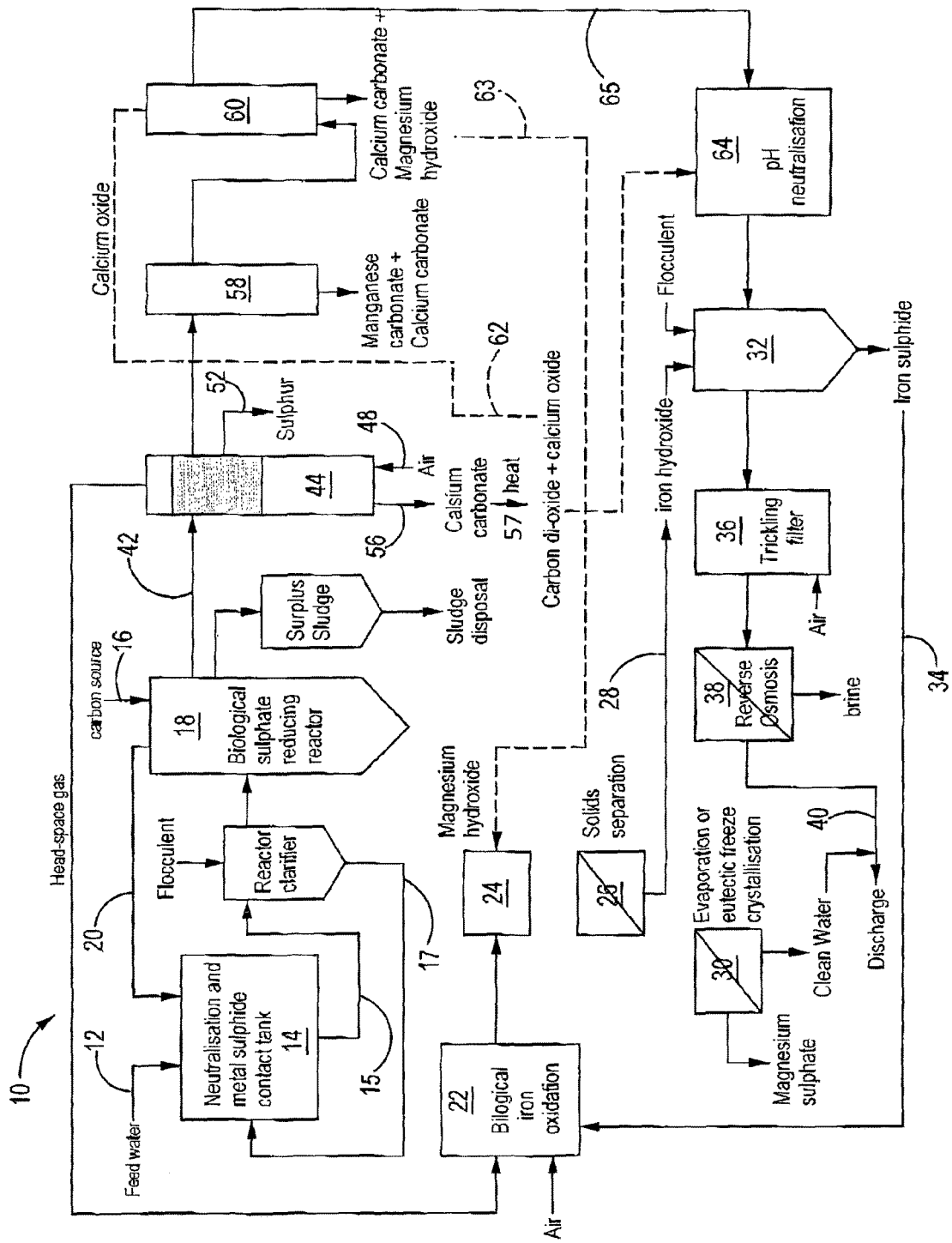

METHOD FOR THE BIOLOGICAL TREATMENT OF SULPHATE CONTAINING WASTE WATER, VIA REDUCTION OF SULPHATE TO SULPHIDE THEN ITS OXIDATION TO ELEMENTAL SULPHUR

CROSS REFERENCE TO RELATED APPLICATIONS

This application is a national stage filing under section 371 of International Application No. PCT/IB2015/055316, filed on Jul. 14, 2015, and published in English on Jan. 21, 2016, as WO 2016/009346 A1, and claims priority of South African application no. 2014/05615 filed on Jul. 18, 2014, the entire disclosure of these applications being hereby incorporated herein by reference.

FIELD OF THE INVENTION

This invention relates to the treatment of wastewater. In particular, the invention relates to a method and a plant for the treatment of sulphate containing effluent.

BACKGROUND OF THE INVENTION

The inventors are aware of four patents in this field as follows:
U.S. Pat. No. 5,587,079 by Rowley et al.
U.S. Pat. No. 6, 197196 by Rose et al.
U.S. Pat. No. 6,203,700 by Rose et al.
EP 1 124 763 by Rose et al.

However, although some of the components of the present invention are similar to those claimed in the above patents, the process as a whole presents a unique solution to the treatment of acidic, sulphate and metal containing wastewater, such as that which is typical of acid mine drainage.

SUMMARY OF THE INVENTION

According to one aspect of the invention, there is provided a process for treating sulphate containing effluent, which includes
  receiving a sulphide containing effluent into a two-phased fluidised bed reactor containing fine limestone particles and low density floating plastic media;
  permitting calcium carbonate from the effluent to precipitate on the fine limestone particles in the two-phase fluidised bed reactor;
  aerating the solution in the first reactor to remove $CO_2$ from the solution, thereby to increase the pH in the reactor;
  permitting biological sulphide oxidation to occur on the low density plastic floating media in the second reactor by means of sulphide oxidizing bacteria (by controlling the redox reaction) thereby to produce elemental sulphur;
  recycling the second fluidised bed reactor at a sufficient rate to effect abrasion to remove elemental sulphur (produced extra-cellularly by the sulphide oxidation bacteria) from the plastic media;
  harvesting the sulphur from a top portion of the reactor;
  internal recycling of hydroxyl ions in solution in the reactor to enhance calcium carbonate precipitation by further increasing the pH.

Receiving a sulphide containing effluent into the two-phase fluidised bed reactor may include receiving the sulphide containing effluent from a biological sulphate reducing reactor. This step may include permitting biological sulphate reduction to occur in the effluent by which sulphate is reduced to hydrogen sulphide through sulphate reducing bacteria. This step may include using an organic carbon source as an electron donor.

The method may include the prior step of receiving a wastewater effluent containing high sulphate concentrations into a neutralisation and metal sulphide-containing reactor. This step may include precipitating iron sulphide in the neutralisation and metal sulphide-containing reactor.

The step may include feeding the precipitated iron sulphide into a biological Iron oxidation reactor. The step may include the further step of oxidizing the ferrous metal to ferric metal. The oxidation may take place at a pH of about 2. The step may include withdrawing effluent from the biological iron oxidation reactor and adding magnesium hydroxide to the effluent to produce iron hydroxide. The step may further include the removal of magnesium sulphate from the effluent. The magnesium sulphate may further be withdrawn by means of any one of evaporation and eutectic freeze to produce magnesium sulphate crystals.

The method may include the further step of passing the effluent from the two-phase fluidised bed reactor to a manganese precipitation reactor. This step may include controlling the pH to about 9.7 to permit precipitation of manganese carbonate from the effluent.

The method may include the further step of passing the effluent from the manganese precipitation reactor to a magnesium precipitation reactor. This step may include controlling the pH in the manganese precipitation reactor to about 10.73 to permit precipitation of magnesium hydroxide from the effluent.

The method may include the further step of feeding the effluent to an iron precipitation reactor and permitting further sulphide precipitation as iron sulphide. This step may include adding iron hydroxide to the effluent.

The method may include the further step of feeding the effluent to a biological effluent treatment process, which may be in the form of a trickling filter. Finally the effluent may be treated in a reverse osmosis membrane reactor.

The invention extends to a treatment plant, which includes
  a neutralisation and metal sulphide-containing reactor into which feed water is received for precipitation of iron sulphide (FeS);
  a two-phase fluidised bed reactor downstream of the neutralisation and metal sulphide-containing reactor containing particles and floating media for removal of calcium carbonate and elemental sulphur through aeration;
  an iron precipitation reactor downstream of the two-phase fluidised bed reactor for precipitation of sulphide as iron sulphide; and
  a biological iron oxidation reactor downstream of the iron precipitation reactor for biological oxidation of the iron sulphide.

The treatment plant may include a biological sulphate reducing reactor between the neutralisation and metal sulphide-containing reactor and the two-phase fluidised bed reactor for reducing sulphate into sulphide while breaking down organic material to produce bicarbonate alkalinity ($HCO_3$) and $H_2S$ is produced.

The treatment plant may include a Manganese removal column at the output of the two-phase fluidised bed reactor, for precipitation of manganese carbonate and calcium carbonate.

The treatment may include a Magnesium removal column at the output of the Manganese removal column for precipitation of manganese as manganese carbonate and for the precipitation of calcium carbonate.

The treatment plant may include a pH neutralisation tank at the output of the Magnesium removal column for neutralising the pH before treating the water with Iron hydroxide to remove sulphide.

The treatment plant may include a trickling filter and a reverse osmosis membrane filter, at the output of the pH neutralisation tank to polish the water.

The invention will now be described by way of a non-limiting example only, with reference to the following drawing.

DRAWING

In the drawing:

FIG. 1 shows a process for treating waste water and a treatment plant in accordance with one example of the invention.

EMBODIMENT OF THE INVENTION

In FIG. 1 the process 10 and treatment plant example is shown in detail. The process is based on biological sulphate reduction (BSR), in which process sulphate is reduced to hydrogen sulphide by sulphate reducing bacteria using an organic carbon source, which also acts as the electron donor, with the simultaneous production of bicarbonate alkalinity.

An organic biodegradable carbon source is introduced through a feed line 16, into a biological sulphate reducing reactor 18. In reactor 18 sulphate is reduced to sulphide while the organic material is broken down. The result is that bicarbonate alkalinity ($HCO_3$) and $H_2S$ are produced and the sulphate concentration is reduced.

The carbon source for the BSR process may be sewage sludge, any organic industrial waste source such as abattoir waste or dairy waste, or may be a fermented carbohydrate source such as maize silage. These carbon sources have a high chemical oxygen demand (COD), which may be in the form of soluble or particulate COD. These carbon sources may be used individually or in various combinations depending on availability and location. The reactor design may depend on the carbon source that is intended. When silage is to be the main carbon source a an expanded sludge bed reactor, a stirred reactor, or the like Upflow Anaerobic Sludge Blanket (UASB) reactor may be used preferentially, but a fixed media reactor or bio-membrane reactors may be preferred in the case of a soluble COD source. The sulphate reducing bacteria are dependent on the action of heterotrophic hydrolytic bacteria to break down the carbon source into volatile fatty acids, which they use as the carbon source for sulphate reduction. The hydrolysis step and the sulphate reduction step occur in the same reactor. In order to prevent limitation of hydrolysis, the volatile fatty acid concentration is carefully monitored and managed through controlled dosing of the carbon source. The hydrolysis of the carbon source results in the release of ammonia nitrogen, which is used as a nitrogen source for the bacteria. When a high protein carbon source such as sewage sludge or abattoir waste is utilized the ammonia concentration in the effluent of the reactor may be high. The protein content of maize silage is low and the amount of ammonia in the effluent will be negligible. There will also be residual soluble COD in the effluent of the biological sulphate reducing reactor. A portion of the organic matter from the biological sulphate reducing reactor will need to be wasted periodically.

The water treatment process 10 starts where feed water enters the process through a feed line 12 into a neutralisation and metal sulphide contact tank 14. The feed water is typically mine water, which contains high sulphate concentrations and is acidic in most instances. It further contains iron, manganese and a range of other contaminants, most of which are soluble.

A fraction of the product produced at 18 is fed from the reactor 18 back to the feedwater in reactor 14 via the feed line 20. This step causes the precipitation of metal, and specifically iron sulphide (FeS) (at 15). The settled product of FeS is then fed into a biological Iron oxidation reactor 22 (at 17) to oxidize the iron and to convert the ferrous metal to ferric metal at a pH of about 2. This process is similar to bioleaching.

From the biological sulphate-reducing reactor 18, the remainder of the effluent is then transferred via 42 to a two-step process 44, in which calcium carbonate and elemental sulphur are removed through aeration. Air is introduced into 44 at 48. Sulphides are converted into sulphur in a biological sulphide oxidation process. Reactor 44 is a two-phase fluidized bed reactor, filled with a floating carrier such as low density plastic media to provide a surface for attachment of bacteria, which forms a bio-film on the surface of the carrier, and fine limestone particles onto which calcium carbonate precipitates. Elemental sulphur is produced extracellularly by the bacteria and the movement of the carrier causes the elemental sulphur to be separated from the bacteria and the elemental sulphur then propagates below the floating media in the reactor 44, which is recovered at 52. In the sulphide oxidation process hydroxyl ions are produced which are recycled internally within reactor 44 to produce more alkalinity in 44, which increases the pH to about 8.3 and causes calcium carbonate to precipitate. Calcium carbonate produced at 44 is released at 56 and when heated to about 900° C. produces calcium oxide and $CO_2$ at 57. The calcium oxide can then be hydrated to form calcium hydroxide for further use in the process. The headspace gas of reactor 44 containing hydrogen sulphide ($H_2S$) gas stripped from solution during aeration is transferred to the biological iron oxidation reactor (22) at 43.

The calcium hydroxide is introduced to the reactors 58, a Manganese removal column, and 60, a Magnesium removal column, via 62 to increase the pH to just below 9.7, the point at which manganese precipitates as manganese carbonate and calcium carbonate also precipitates.

At 58 further calcium hydroxide (quicklime) can be added to the effluent of the biological sulphide oxidation reactor in order to increase the pH further to just below 10.73, the pH required for precipitation of magnesium hydroxide. This will allow manganese to precipitate as manganese carbonate and avoid the simultaneous precipitation of magnesium hydroxide. A portion of the carbonic species remains in solution after the sulphide removal step, so calcium carbonate will be precipitated simultaneously. These will be recovered in a settling tank.

At 60 more calcium hydroxide is required to increase pH to above 10.73 and magnesium hydroxide and calcium carbonate then precipitate from 60. The magnesium hydroxide can be fed to 24 via 63. The water in 60 still contains ammonia and a residual COD and sulphide concentration. The pH in 60 is also high. The sulphide that remains in the solution (at 65) at this point is then removed by the addition of iron hydroxide at 32 to precipitate the sulphide as iron sulphide. A flocculent will be added to aid settling in a settling tank. This iron sulphide as well as the iron sulphide precipitated in the initial acid neutralisation and iron precipitation reactor (14) will then be oxidized biologically in a single aerated biological ferrous iron oxidising reactor (22) containing solid growth media at pH 2.

Carbon dioxide is added into a pH neutralisation tank 64 to neutralise the pH and the water is treated with Iron hydroxide to ensure that all sulphide is removed. This $CO_2$ may be sourced from the calcining reaction at 57.

By adding magnesium hydroxide (Mg(OH)2) at reactor 24 into the liquid stream from the reactor 22 and increasing the pH to 4, all the iron precipitates but all the magnesium remains in solution as magnesium sulphate ($MgSO_4$). The solids and solution are separated at 26 to produce iron hydroxide at line 28 and dewater the magnesium suphate in 30 to recover the Magnesium sulphates as solids by means of evaporation or eutectic freeze. Iron sulphide produced at 32 is fed back to the reactor 22 at 34.

The output from process 32 is then treated at 36, a trickling filter and 38, a reverse osmosis filter to render clean water at 40, together with clean water from process 30.

In summary the process treat wastewater as follows:

Wastewater with a high acidity (around pH 3.5-3.7) is received at 12 and at 14 iron and acidity is neutralized (to about 6.3). At 18, a carbon source is added at 16, sulphide and bicarbonate alkalinity are produced and there is residual organic material and ammonia in solution. At 44, calcium is removed as calcium carbonate, elemental sulphur is produced and alkalinity is produced. At 58, calcium carbonate recovered at 44 is added to the solution after calcining at 57 to remove manganese. Calcium carbonate is also precipitated. At 60 magnesium hydroxide and calcium carbonate are recovered. At 64 the pH is further neutralized and at 32 iron sulphide is removed and used at 22 to produce ferric sulphate and magnesium sulphate and at 28, iron hydroxide is withdrawn.

The inventors are of the opinion that the invention provides a novel process for the treatment of sulphate containing wastewater and a new treatment plant that provides advantages over the prior art, which is of substantial benefit in the treatment of wastewater. In particular, the manner that sulphide is removed from the solution and the fact that the feed water can be neutralized and all the calcium can be removed using only biogenically produced alkalinity in the form of bicarbonate alkalinity and hydroxyl ions, without the need to introduce additional lime from an external source is believed to be of substantial benefit in the field of wastewater treatment.

The invention claimed is:

1. A process for treating sulphate containing effluent, which includes
   reducing sulphate contained in a sulphate containing effluent to sulphide in a biological sulphate reducing reactor, wherein sulphate is reduced to sulphide through sulphate reducing bacteria;
   receiving the effluent from the biological sulphate reducing reactor into a two-phase fluidised bed reactor containing limestone particles and low density plastic floating media;
   precipitating calcium carbonate from the effluent on the limestone particles in the two-phase fluidised bed reactor;
   aerating the effluent in the two-phase fluidised bed reactor to remove $CO_2$ produced in the biological sulphate reducing process, thereby to increase the pH of the effluent in the two-phase fluidised bed reactor;
   producing elemental sulphur on the plastic floating media through biological sulphide oxidation of the effluent by sulphide oxidizing bacteria on the low density plastic floating media;
   recycling, within the fluidized bed reactor, the contents of the fluidized bed reactor, wherein recycling removes elemental sulphur from the plastic floating media through abrasion;
   harvesting the elemental sulphur from below the low density plastic floating media in a top portion of the two-phase fluidised bed reactor; and
   recycling within the two-phase fluidized bed reactor, hydroxyl ions produced by the sulphide oxidation process, wherein recycling hydroxyl ions produced by the sulphide oxidation process comprises further increasing the pH of the solution and increasing the pH of the solution comprises enhancing calcium carbonate precipitation.

2. The process as claimed in claim 1, in which the step of reducing sulphate contained in a sulphate containing effluent to sulphide in a biological sulphate reducing reactor more specifically includes reducing the sulphate in the biological sulphate reduction process to produce hydrogen sulphide.

3. The process as claimed in claim 2, which includes using an added organic carbon source as an electron donor in the biological sulphate reducing reactor, producing bicarbonate alkalinity and hydrogen sulphide.

4. The process as claimed in claim 1, which includes the prior step of receiving a feedwater effluent containing sulphate into a neutralisation and metal sulphide-containing reactor in which iron sulphide (FeS) is precipitated.

5. The process as claimed in claim 4, which includes feeding the precipitated iron sulphide into a biological iron oxidation reactor.

6. The process as claimed in claim 5, which includes the further step of oxidizing the ferrous metal to ferric metal at a pH of about 2.

7. The process as claimed in claim 6, which includes withdrawing effluent from the biological iron oxidation reactor and adding magnesium hydroxide to the effluent to produce solid iron hydroxide and dissolved magnesium sulphate in solution, followed by separation of the solid iron hydroxide.

8. The process as claimed in claim 7, which further includes the removal of dissolved magnesium sulphate from the effluent by means of evaporation to produce magnesium sulphate crystals.

9. The process as claimed in claim 1, which includes the further step of passing the effluent from the two-phase fluidised bed reactor to a manganese precipitation reactor and controlling the pH in the manganese precipitation reactor to about 9.7 to permit precipitation of manganese carbonate and calcium carbonate from the effluent.

10. The process as claimed in claim 9, which includes the further step of passing the effluent from the manganese precipitation reactor to a magnesium precipitation reactor and controlling the pH in the magnesium precipitation reactor to about 10.73 to permit precipitation of magnesium hydroxide and calcium carbonate from the effluent.

11. The process as claimed in claim 7, which further includes the removal of dissolved magnesium sulphate from the effluent by means of eutectic freeze to produce magnesium sulphate crystals.

12. The process as claimed in claim 10 which includes the further step of neutralizing the effluent by the addition of carbon dioxide, the source of which is the calcination of the calcium carbonate produced at the two-phased reactor in claim 1.

13. The process as claimed in claim 12, which include the further step of feeding the effluent to an iron precipitation reactor and adding iron hydroxide to the effluent permitting further sulphide precipitation as iron sulphide.

14. The process as claimed in claim 13, which includes the further step of feeding the effluent from the iron precipitation reactor to a biological effluent treatment process in the form of a trickling filter followed by a reverse osmosis membrane reactor.

* * * * *